(12) United States Patent
Teragawa

(10) Patent No.: US 9,971,082 B2
(45) Date of Patent: May 15, 2018

(54) DISPLAY APPARATUS

(71) Applicant: SAKAI DISPLAY PRODUCTS CORPORATION, Sakai-shi, Osaka (JP)

(72) Inventor: Daisuke Teragawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days. days.

(21) Appl. No.: 15/623,590

(22) Filed: Jun. 15, 2017

(65) Prior Publication Data

US 2017/0285246 A1 Oct. 5, 2017

Related U.S. Application Data

(63) Continuation of application No. PCT/JP2014/083609, filed on Dec. 18, 2014.

(51) Int. Cl.
*F21V 8/00* (2006.01)

(52) U.S. Cl.
CPC ......... *G02B 6/0043* (2013.01); *G02B 6/0055* (2013.01); *G02B 6/0088* (2013.01)

(58) Field of Classification Search
CPC ... G02B 6/0043; G02B 6/0088; G02B 6/0055
See application file for complete search history.

(56) References Cited

U.S. PATENT DOCUMENTS

| 5,995,288 A * | 11/1999 | Kashima | G02B 5/021 |
| | | | 359/599 |
| 2008/0273352 A1 * | 11/2008 | Ueno | G02B 1/105 |
| | | | 362/620 |

FOREIGN PATENT DOCUMENTS

| JP | 2000-275410 A | 10/2000 |
| JP | 2006-004651 A | 1/2006 |
| JP | 2013-191510 A | 9/2013 |
| WO | WO 2006/061961 A1 | 6/2006 |

OTHER PUBLICATIONS

Int'l. Search Report issued in Int'l. App. No. PCT/JP2014/083609, dated Jan. 20, 2015.

* cited by examiner

*Primary Examiner* — David Bruce
(74) *Attorney, Agent, or Firm* — Greer Burns & Crain Ltd.

(57) ABSTRACT

A display apparatus includes: a rectangular display panel, which includes a screen frontward thereof; an optical sheet having a rectangular shape, which is arranged rearward of the rectangular display panel; a light guide plate having a rectangular shape, which is arranged rearward of the optical sheet; a light source, which is arranged to face a side surface of the light guide plate; and a first close contact prevention layer provided on a surface, facing the optical sheet, of the light guide plate, wherein the first close contact prevention layer comprises a first binder and a plurality of first beads dispersed in the first binder, and the plurality of first beads form a plurality of first protrusions for preventing close contact with the optical sheet, at a surface of the first close contact prevention layer.

8 Claims, 11 Drawing Sheets

1

DISPLAY APPARATUS

This is a continuation of International Application No. PCT/JP2014/083609, with an international filing date of Dec. 18, 2014, the entire contents of which are hereby incorporated by reference.

BACKGROUND OF THE INVENTION

1. Field of the Invention

The present invention relates to a display apparatus including a rectangular display panel, which includes a screen frontward thereof, an optical sheet having a rectangular shape, which is arranged rearward of the rectangular display panel, a light guide plate having a rectangular shape, which is arranged rearward of the optical sheet, and a light source, which is arranged to face a side surface of the light guide plate.

2. Description of the Related Art

A liquid crystal display apparatus as a display apparatus has features of being thin and low power consumption, has become popular in recent years as a display replacing a conventional cathode ray tube (CRT) for its increased display quality, and is also widely used as an image display unit of a television set (hereinafter referred to as "TV set"). As opposed to a self-light-emitting device, the liquid crystal display apparatus requires a backlight as a light source, and controls a light transmittance, which is determined by electro-optical characteristics of a liquid crystal, to display an image.

The backlight includes an edge-lit type (side lighting system, light guide plate system) and a direct-lit type.

As a liquid crystal display apparatus including the backlight of the edge-lit type, in order to achieve reductions in thickness and weight, and a narrow frame, there is known a liquid crystal display apparatus formed by covering a display module with a frame. The display module is formed by arranging a backlight unit rearward of a liquid crystal display panel (hereinafter referred to as "display panel"). The backlight unit is formed by housing, in a rectangular box-shaped chassis [backlight (BL) chassis], a light guide plate, a plurality of optical sheets, and a light emitting diode (LED) substrate. The LED substrate is formed by mounting a plurality of LEDs on a planar surface of a slim substrate. When the backlight unit is of a one-side edge-lit type, the LED substrate is arranged on one long side surface of a rectangular plate-shaped light guide plate. Light that has been emitted from the LEDs and has entered the long side surface of the light guide plate is output from a main surface of the light guide plate to illuminate a rear surface of the display panel.

When the backlight unit is of the direct-lit type, a plurality of LED substrates are provided on a bottom surface of the chassis. A reflection sheet is placed on the bottom surface under a state in which a dispersion lens covering each LED is exposed, and with a diffusion plate being arranged slightly on an aperture side of the dispersion lens, the optical sheets are arranged on an upper side of the diffusion plate.

The optical sheet has functions of refracting a peak direction of a light beam toward a normal direction side, and diffusing or collecting brightness distribution, for example.

FIG. 8 is a schematic cross-sectional view for illustrating a related-art display module 17 of an edge-lit type.

The display module 17 includes a light guide plate 2, a reflection sheet 4, an optical sheet 5, an LED substrate 7, a display panel 8, and a chassis 9.

The chassis 9 has a substantially box shape that is open toward the display panel 8. The chassis 9 houses the light guide plate 2 in a state in which the reflection sheet 4 is arranged on a bottom surface.

The light guide plate 2 has a rectangular plate shape, and on a rear surface (lower surface) facing the reflection sheet 4 of the light guide plate 2, a plurality of scattering dots 21, 21, . . . are formed by printing. In addition, the LED substrate 7 is arranged to face one long side surface of the light guide plate 2. The LED substrate 7 is formed by mounting a plurality of LEDs 71 on a planar surface of a substrate main body.

Light from the LEDs 71 is introduced to the above-mentioned long side surface, and the light repeats total internal reflection to spread within the light guide plate 2. On the rear surface of the light guide plate 2, light having an angle of incidence (shallow angle of incidence) that is larger than a boundary angle (critical angle) is totally reflected. The totally reflected light incident on a surface (exit surface, upper surface) of the light guide plate 2 at the same angle of incidence is totally reflected. Light that has impinged on the scattering dot 21 changes its direction, and travels toward the surface of the light guide plate 2 at an angle (deep angle of incidence) that is smaller than the boundary angle to be output from the surface toward the display panel 8. The light guide plate 2 is configured so that an area of the scattering dot 21, that is, a print diameter of the scattering dot 21 closer to the LED substrate 7 becomes smaller, and the area of the scattering dot 21, that is, the print diameter becomes larger as the scattering dot 21 becomes farther away from the LED substrate 7, to thereby extract light uniformly over the entire light guide plate 2.

The display panel 8 includes a color filter substrate, a liquid crystal layer, a thin film transistor (TFT) substrate, and two polarizing plates. The color filter substrate and the TFT substrate are attached to each other via a sealing material, and the liquid crystal layer is interposed therebetween.

The optical sheet 5 is a group of sheets which may include a diffusion sheet, a lens sheet, a dual brightness enhancement film (DBEF) sheet (reflective polarizer sheet), and other such sheets, and is arranged frontward of the light guide plate 2. This optical sheet 5 diffuses or collects the light output from the upper surface of the light guide plate 2.

At this time, when the light guide plate 2 and the optical sheet 5 are partially brought into close contact with each other due to static electricity or other such causes, as illustrated in FIG. 8, the light having the shallow angle of incidence is transmitted to the optical sheet 5, and is scattered to flash on a surface of the optical sheet 5.

In order to prevent the above-mentioned close contact between a rear surface of the optical sheet 5 and the surface of the light guide plate 2, there is disclosed a display module of Japanese Laid-Open Patent Publication No. 2000-275410 (hereinafter "Patent Document 1").

FIG. 9 is a schematic cross-sectional view for illustrating a related-art display module 18 of Patent Document 1, for example. FIG. 10 is a partially enlarged cross-sectional view of FIG. 9. In FIG. 9 and FIG. 10, parts identical to those in FIG. 8 are denoted by like reference numerals, and a detailed description thereof is omitted.

In this display module 18, a close contact prevention layer 6 is formed on the rear surface of the optical sheet 5. The close contact prevention layer 6 is formed of a binder 61, which is formed on the rear surface of the optical sheet 5, and beads 62, which are dispersed in the binder 61 in a state in which portions of the beads 62 are protruded from a surface of the binder 61.

In the display module of Patent Document 1, as materials of the beads 62 and the binder 61, a soft elastomeric material having a glass transition temperature of −100° C. or more and 30° C. or less is used.

According to this display module 18, the beads 62 protruded from the rear surface of the optical sheet 5 reliably prevent the close contact between the optical sheet 5 and the light guide plate 2. Therefore, as opposed to the display module 17, light is not output from the close contact portion between the light guide plate 2 and the optical sheet 5 to be transmitted through the optical sheet 5.

However, in the case of the display module 18, when the optical sheet 5 is applied with a load to slide with respect to the light guide plate 2, as illustrated in FIG. 10, a flaw 22 may be generated on the surface of the light guide plate 2 by the beads 62. In this case, light is output from the flaw 22, and is transmitted through the optical sheet 5 to be scattered on an upper surface of the optical sheet 5. An amount of light is increased at this portion to generate a white spot (white spot defect).

FIG. 11A is a schematic front view of the display module 18 for illustrating a state in which white spot defects have occurred, and FIG. 11B is a schematic cross-sectional view for illustrating a state in which the light output from the flaw 22 is scattered by the optical sheet 5. As illustrated in FIG. 11A, a plurality of white spots 19 are generated by the flaws 22 of the light guide plate 2 to reduce image quality.

In recent years, as the display module becomes larger, a friction amount due to a difference in coefficient of linear expansion between the optical sheet 5 and the light guide plate 2 and other such factors becomes larger. A warpage amount of members other than the optical sheet 5 also becomes larger, and a load partially applied to the optical sheet 5 also becomes larger. Therefore, the light guide plate 2 has become easier to be flawed, and the white spot defect has become easier to occur.

When an amount of protrusion of the beads 62 is reduced or when an application density of the beads 62 is reduced in order to prevent the flaw 22 from being generated in the light guide plate 2, a likelihood of the optical sheet 5 being brought into close contact with the light guide plate becomes higher, and the effects of forming the close contact prevention layer 6 are reduced.

SUMMARY OF THE INVENTION

The present invention has been made under such circumstances, and therefore has an object to provide a display apparatus, which is capable of preventing close contact between a light guide plate and an optical sheet, and hence preventing a flaw from being generated in the light guide plate, to thereby satisfactorily suppress occurrence of a white spot defect based on light output due to the flaw.

A display apparatus according to one embodiment of the present invention includes: a rectangular display panel, which includes a screen frontward thereof; an optical sheet having a rectangular shape, which is arranged rearward of the rectangular display panel; a light guide plate having a rectangular shape, which is arranged rearward of the optical sheet; a light source, which is arranged to face a side surface of the light guide plate; and a plurality of protrusions, which are provided on a surface, facing the optical sheet, of the light guide plate, for preventing close contact with the optical sheet.

According to one embodiment of the present invention, the protrusions formed on a surface of the light guide plate prevent partial close contact between the light guide plate and the optical sheet, and when the optical sheet is applied with a strong load to slide with respect to the light guide plate, the flaw is not generated in the light guide plate as opposed to the case where the close contact prevention layer is formed on the optical sheet as in the related-art.

The display apparatus according to one embodiment of the present invention includes an adhesive resin film provided on the surface, facing the optical sheet, of the light guide plate, and the plurality of protrusions are beads dispersed in the adhesive resin film in a state in which portions of the beads are protruded from a surface of the adhesive resin film.

According to one embodiment of the present invention, the protrusions for maintaining the gap with the optical sheet are easily formed on the surface of the light guide plate so that close contact of the optical sheet to the light guide plate can be prevented.

The display apparatus according to one embodiment of the present invention includes a close contact prevention layer, which includes an adhesive resin film formed on the surface, facing the light guide plate, of the optical sheet, and beads dispersed in the adhesive resin film in a state in which portions of the beads are protruded from a surface of the adhesive resin film.

According to one embodiment of the present invention, the flaw can be prevented from being generated with a friction of the optical sheets due to oscillations and other such causes during storage in stack and conveyance of the optical sheets, and the optical sheet can be prevented from adhering during manufacture of the display apparatus.

In the display apparatus according to one embodiment of the present invention, the beads of the close contact prevention layer has an amount of protrusion that is smaller than an amount of protrusion of the beads of the light guide plate.

According to one embodiment of the present invention, the flaw can be prevented from being generated in the light guide plate more satisfactorily.

In the display apparatus according to one embodiment of the present invention, the expression $1<n_2<n_1$ is satisfied, where $n_1$ represents a refractive index of the light guide plate, and $n_2$ represents a refractive index of the adhesive resin film of the light guide plate.

According to one embodiment of the present invention, total internal reflection may take place at an interface between the adhesive resin film and the light guide plate, and therefore the amount of light that reaches the surface of the adhesive resin film and is scattered by the beads is reduced.

In the display apparatus according to one embodiment of the present invention, the light guide plate has scattering dots formed by printing on a surface opposite to an exit surface facing the optical sheet, the scattering dots being configured to reflect light so as to be output through the exit surface, and a number of the beads per unit area is determined based on a minimum value of print diameters of the scattering dots.

According to one embodiment of the present invention, the number of beads per unit area is determined based on the minimum value of the print diameters of the scattering dots, for example, a limit value of a minimum value of actual values of the print diameters that does not cause a variation or printing distortion during printing of the scattering dots, with the result that a printing area of the scattering dots is reduced to cancel an increase of output light due to scattering by the beads, and that the scattering dots can be formed on the light guide plate satisfactorily to suppress occurrence of line unevenness.

According to one embodiment of the present invention, the protrusions for preventing close contact with the optical sheet are formed on a surface, facing the optical sheet, of the light guide plate, with the result that the close contact between the light guide plate and the optical sheet is prevented, that the flaw is prevented from being generated in the light guide plate, and that the occurrence of the white spot defect based on the light output due to the flaw is prevented.

DETAILED DESCRIPTION OF PREFERRED EMBODIMENTS

Embodiment 1

Figure 1:
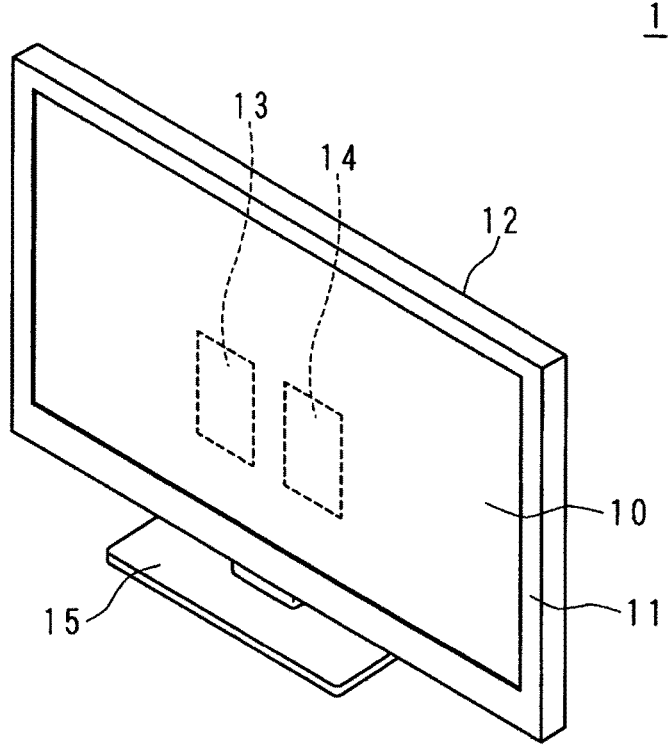
FIG. 1 is a perspective view of an appearance of a front side of a TV set including a display apparatus (display module) according to Embodiment 1 of the present invention.

FIG. 1 is a perspective view of an appearance of a front side of a TV set 1 including a display apparatus (display module) 10 according to Embodiment 1 of the present invention.

The TV set 1 includes the display module 10 including a display panel 8, which is horizontally long and is configured to display a picture, a tuner 13, which is configured to receive broadcast waves from an antenna (not shown), and a decoder 14, which is configured to decode encoded broadcast waves. The TV set 1 decodes the broadcast waves received by the tuner 13 in the decoder 14, and displays a picture on the display module 10 based on decoded information. In a lower part of the TV set 1, a stand 15, which is configured to support the display module 10, is provided.

The display module 10 is housed between a front cabinet 11 and a rear cabinet 12, which are arranged in the front and back in a longitudinal posture, in a longitudinal posture. The front cabinet 11 is a rectangular frame covering a peripheral portion of the display module 10, and has a rectangular opening at the center. The front cabinet 11 is made of a synthetic resin, for example. The rear cabinet 12 has a rectangular tray shape that is open on a front side, and is made of a synthetic resin, for example. The front cabinet 11 and the rear cabinet 12 may be made of other materials.

The front cabinet 11 and the rear cabinet 12 have substantially the same vertical and horizontal dimensions, and peripheral portions opposed to each other. The peripheral portion of the display module 10 is opposed to an inner edge portion of the front cabinet 11.

Figure 2:
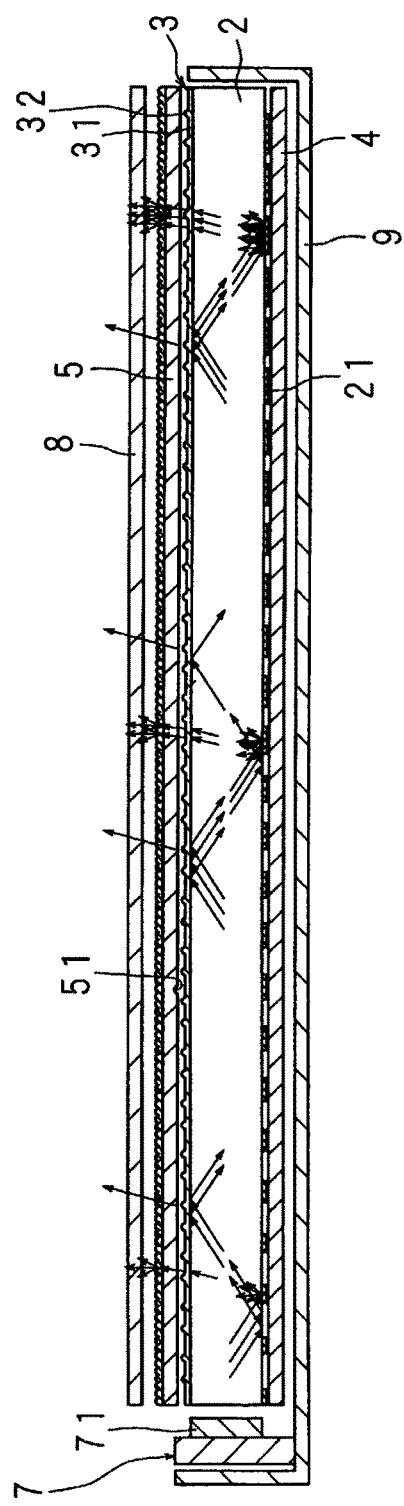
FIG. 2 is a schematic cross-sectional view of the display module according to Embodiment 1 of the present invention.
Figure 3:
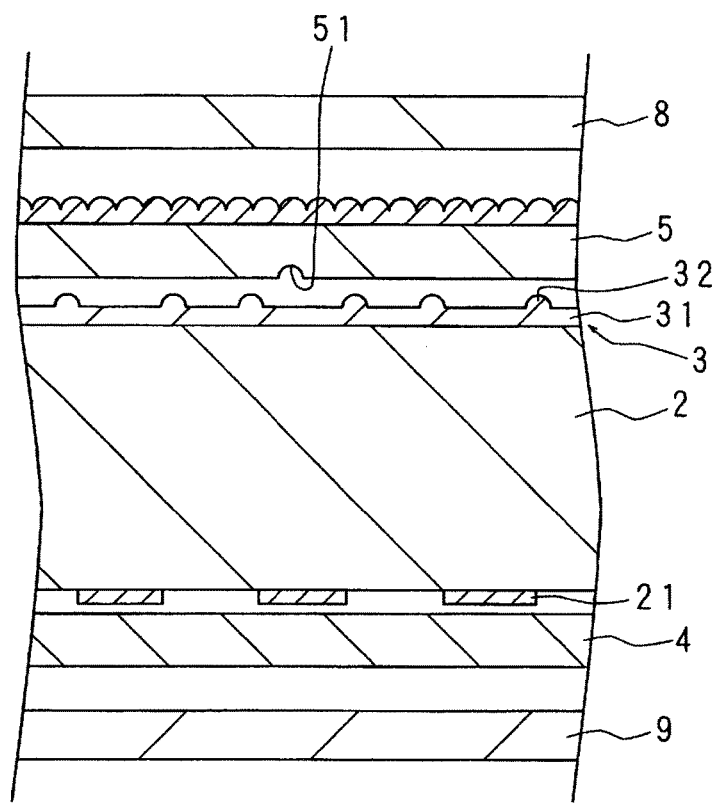
FIG. 3 is a partially enlarged cross-sectional view of FIG. 2.

FIG. 2 is a schematic cross-sectional view of the display module 10, and FIG. 3 is a partially enlarged cross-sectional view of FIG. 2.

The display module 10 includes a light guide plate 2, a reflection sheet 4, an optical sheet 5, an LED substrate 7, a display panel 8, and a chassis 9.

The chassis 9 has a substantially box shape that is open toward the display panel 8, and houses the light guide plate 2 in a state in which the reflection sheet 4 is arranged on the bottom surface.

The light guide plate 2 has a rectangular plate shape, and is made of an acrylic resin, for example, polymethyl methacrylate (PMMA). When the light guide plate 2 is made of PMMA, the light guide plate 2 has a refractive index of 1.49, for example. On a lower surface of the light guide plate 2, a plurality of scattering dots 21, 21, . . . are formed by printing. The LED substrate 7 is arranged to face the one long side surface of the light guide plate 2, and as a distance from the LED substrate 7 becomes larger, an area of the scattering dot 21 becomes larger. In other words, the scattering dot 21 close to the LED substrate 7 has the smallest print diameter. With this configuration, an extraction amount of light is increased as a distance from the LED substrate 7 becomes larger so that the entire light guide plate 2 emits light uniformly.

On a planar surface of a substrate main body of the LED substrate 7, a plurality of LEDs 71 are mounted.

On an upper surface of the light guide plate 2, a close contact prevention layer 3 is formed.

The close contact prevention layer 3 includes a binder (adhesive resin film) 31, which is formed on the light guide plate 2, and beads (protrusions) 32, which are dispersed in the binder 31 in a state in which portions of the beads 32 are protruded from a surface of the binder 31.

Examples of a material of the binder 31 include a soft elastomeric material having a glass transition temperature of −100° C. or more and 30° C. or less, for example. Specifically, the examples include, for example, an acrylic resin, polyurethane, polyester, a fluorine-based resin, a silicone resin, polyamide-imide, and an epoxy resin. The binder 31 may contain, in addition to a polymer, a plasticizer, a stabilizer, an antidegradant, a dispersant, and an antistatic agent, for example. The binder 31 needs to be optically transparent, and is preferably clear and colorless.

Examples of a material of the beads 32 include, as with the binder 31, a soft elastomeric material. Specifically, the examples include polyurethane, silicone rubber, polystyrene, and a thermoplastic polyester. The beads 32 need to be optically transparent, and are preferably clear and colorless.

The beads 32 are substantially spherical, and from the viewpoint of preventing close contact, have an average particle diameter of preferably 8 μm or more and 20 μm or less, and more preferably 12 μm or more and 18 μm or less.

An amount of protrusion of the beads 32 from the surface of the binder 31 when the binder 31 mixed with the beads 32 is applied to the surface of the light guide plate 2 is preferably more than 5 μm and 12 μm or less, and more preferably 6 μm or more and 10 μm or less.

Light from the LEDs 71 is introduced to the above-mentioned long side surface, and the light repeats total internal reflection to spread within the light guide plate 2. On a rear surface of the light guide plate 2, light having an angle of incidence (shallow angle of incidence) that is larger than a boundary angle is totally reflected. The totally reflected light impinges on the surface of the light guide plate 2 at the same angle of incidence to be totally reflected. When the light impinges on the scattering dot 21 on the rear surface of the light guide plate 2, the light is scattered, and light having an angle of incidence (deep angle of incidence) that is smaller than the boundary angle travels toward the surface of the light guide plate 2, and is transmitted through the surface to be output toward the optical sheet 5.

The optical sheet 5 is a group of sheets including a diffusion sheet, a lens sheet, a DBEF sheet (reflective polarizer sheet), and other such sheets, and is arranged frontward of the light guide plate 2. This optical sheet 5 diffuses or collects the light output from the surface of the light guide plate 2. Between the display panel 8 and the optical sheet 5, a light diffusion layer is provided.

When the close contact prevention layer 3 is formed on the surface of the light guide plate 2 as in Embodiment 1, as illustrated in FIG. 2, there is light that enters the beads 32 to be scattered and output to the optical sheet 5 side, and weak light is output over the entire surface.

Therefore, when a print pattern of the scattering dot 21 on the rear surface of the light guide plate 2 is not changed, an extraction amount of light is large (bright) near the LED substrate 7, and an extraction amount of light becomes smaller (darker) as distance from the LED substrate 7 becomes larger.

When a refractive index of the light guide plate 2 is represented by $n_1$, a refractive index of the binder 31 is represented by $n_2$, and $n_2$ is set to be smaller than $n_1$, total internal reflection may take place at an interface between the binder 31 and the light guide plate 2. Therefore, it is preferred that $1 < n_2 < n_1$. The smaller the refractive index of the binder 31, the wider the range of angle that total internal reflection takes place. Then, an amount of light that travels toward the surface of the binder 31 is reduced, and an amount of light that impinges on the beads 32 is also reduced. Examples of a material of the light guide plate 2 include materials having various refractive indices, such as PMMA, polymethacrylic styrene (MS), polystyrene (PS), polycarbonate (PC), and glass, but it is preferred that the binder 31 have a lower refractive index.

In order to cancel an increase in amount of extracted light due to scattering by the beads 32, it may be contemplated to reduce a print area of the scattering dot 21 on the rear surface of the light guide plate 2. However, when the print diameter of the scattering dot 21, that is, the print diameter of the smallest scattering dot 21 near the LED substrate 7 is reduced, there is a fear that line unevenness may occur when a printing distortion or deformation occurs due to a variation in printing or other such causes. Hence, there is a limit in reducing the print diameter.

Figure 4:
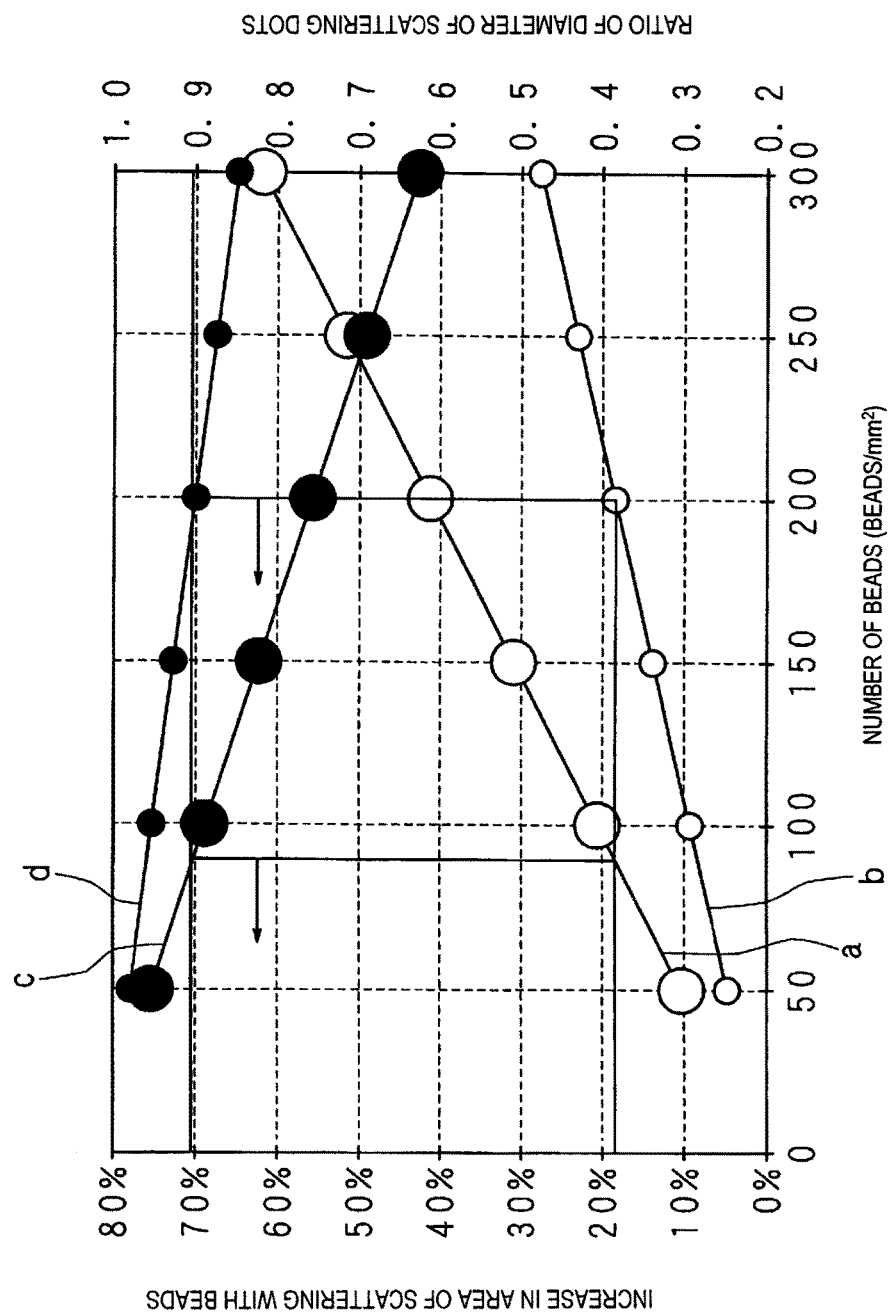
FIG. 4 is a graph for showing a relationship between the number of beads per unit area, and each of an increase in area of scattering with the beads and a reduction ratio of the minimum diameter of scattering dots.

FIG. 4 is a graph for showing a relationship between the number of beads 32 per unit area, and each of an increase in area of scattering with the beads 32 and a reduction ratio of the minimum diameter of the scattering dot 21. The horizontal axis of FIG. 4 indicates the number of beads 32 (beads/mm$^2$), the vertical axis on the left indicates the increase in area of scattering with the beads 32 (%), and the vertical axis on the right indicates a ratio of an actual value of the print diameter of the scattering dot to a minimum value (with the actual value being 1).

In FIG. 4, a is a graph for showing a relationship between the number of beads 32 and the increase in area of scattering with the beads 32 when the diameter of the beads 32 is 15 μm, and b is a graph for showing a relationship between the number of beads 32 and the increase in area of scattering when the diameter of the beads 32 is 10 μm. Further, c is a graph for showing a relationship between the number of beads 32 and the reduction ratio of the actual value of the print diameter from a minimum value when the minimum value of the print diameters of the scattering dots 21 is determined so as to subtract the increase in area of scattering with the beads 32 from a print area of the scattering dot when the diameter of the beads 32 is 15 μm, and d is a graph for showing a relationship between the number of beads 32 and the reduction ratio of the actual value of the print diameter from the minimum value when the diameter of the beads 32 is 10 μm.

When it is assumed that the minimum value of the actual values of the print diameters of the scattering dots 21 is 0.33 mm, that a limit value of the print diameter (value when a ratio of the actual value to the minimum value is 0.9) is 0.3 mm, and that an amount of output light due to scattering by the scattering dot 21 and an amount of output light from the beads 32 of the light guide plate 2 are the same per unit area, it can be seen from FIG. 4 that the minimum value of the print diameters may be set to 0.3 mm with 200 beads/mm$^2$ or less in the case where the diameter of the beads 32 is 10 μm, and with 90 beads/mm$^2$ or less in the case where the diameter of the beads 32 is 15 μm. In other words, the minimum print diameter may be set to 90% or more of the minimum value of the actual value. When a difference in light output capacity between the scattering dot 21 and the beads 32, a distance (margin) from an entrance surface of the light guide plate 2 to the smallest scattering dot 21, or other such factors are changed, the maximum number of beads 32 is calculated accordingly.

As described above, the effects on the diameter of the scattering dot 21 near a plane of incidence of the light guide plate 2 can be suppressed to 10% or less.

When the optical sheet 5 is applied with a load to slide on the light guide plate 2, with the close contact prevention layer 3 being formed on the light guide plate 2, occurrence of a flaw in the light guide plate 2 is suppressed.

In this case, a flaw may be generated in the optical sheet 5. In FIG. 3, there is illustrated a case where a flaw 51 is generated in the optical sheet 5. With no flaw being generated in the light guide plate 2, there is no increase in amount of output light from the light guide plate 2. Moreover, there may be a case where a scattering property may be increased due to the flaw 51, but with no increase in amount of light output from the light guide plate 2, a white spot is not visually perceived after light has passed through the plurality of sheets of the optical sheet 5.

Moreover, in portions of the light guide plate 2 in which the beads 32 are formed, light is output without being fully reflected, and hence even when a flaw is generated in the beads 32, a direction of scattering is merely widened to some extent, and no white spot is generated.

Figure 5A:
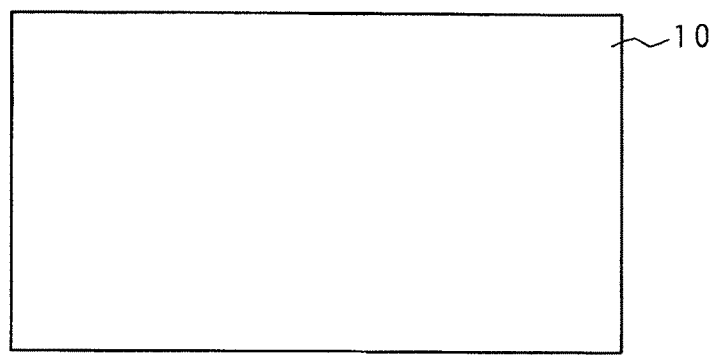
FIG. 5A is a schematic front view of the display module according to Embodiment 1 of the present invention.
Figure 5B:
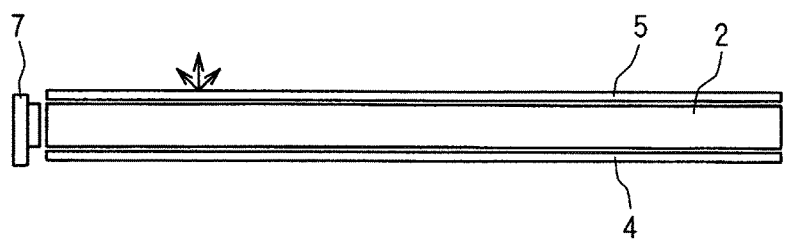
FIG. 5B is a schematic cross-sectional view for illustrating a state in which light output from a flaw is scattered by an optical sheet.

FIG. 5A is a schematic front view of the display module 10, and FIG. 5B is a schematic cross-sectional view for illustrating a state in which light output from the flaw 51 is scattered by the optical sheet 5.

As illustrated in FIG. 5B, a degree of scattering of light by the flaw 51 is increased. An amount of light from the light guide plate 2 is not increased. When the optical sheet 5 is formed of one sheet, an amount of light at the portion of the flaw 51 of the sheet is increased. However, in order to increase brightness and reduce unevenness of brightness, the optical sheet 5 is formed of a plurality of sheets, and hence the brightness is uniformized, and no white spot is visually perceived as illustrated in FIG. 5A.

As described above, in Embodiment 1, the beads 32 formed on the light guide plate 2 prevent the partial close contact between the light guide plate 2 and the optical sheet 5, and when the optical sheet 5 is applied with a strong load to slide with respect to the light guide plate 2, the flaw is prevented from being generated in the light guide plate 2, and occurrence of a white spot defect at the time of emitting light is suppressed.

Embodiment 2

A display module 16 according to Embodiment 2 of the present invention has the structure similar to that of the display module according to Embodiment 1 except that a close contact prevention layer 6 is formed on a lower surface of the optical sheet 5.

Figure 6:
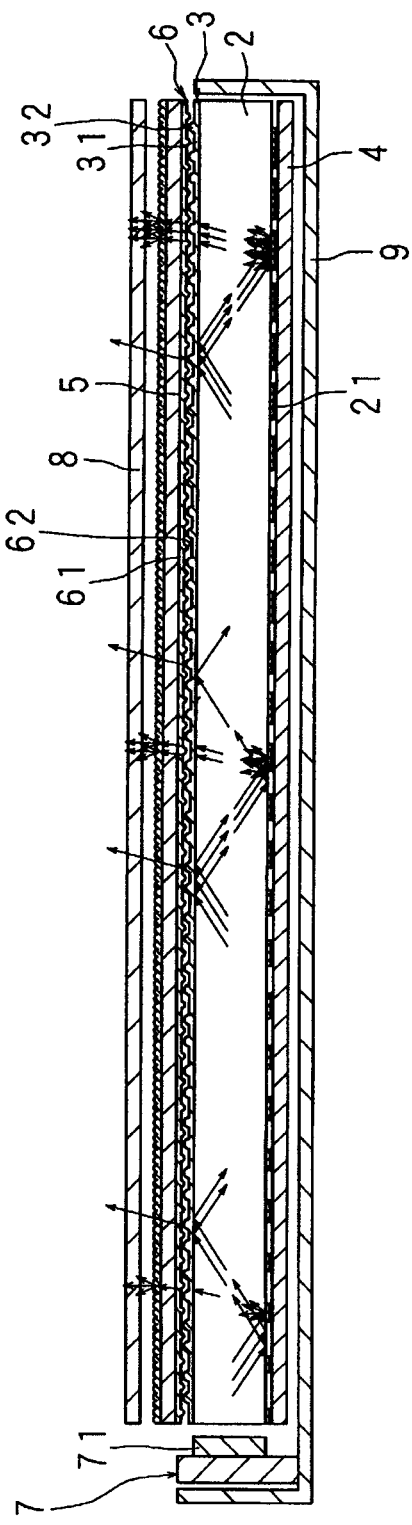
FIG. 6 is a schematic cross-sectional view of a display module according to Embodiment 2 of the present invention.
Figure 7:
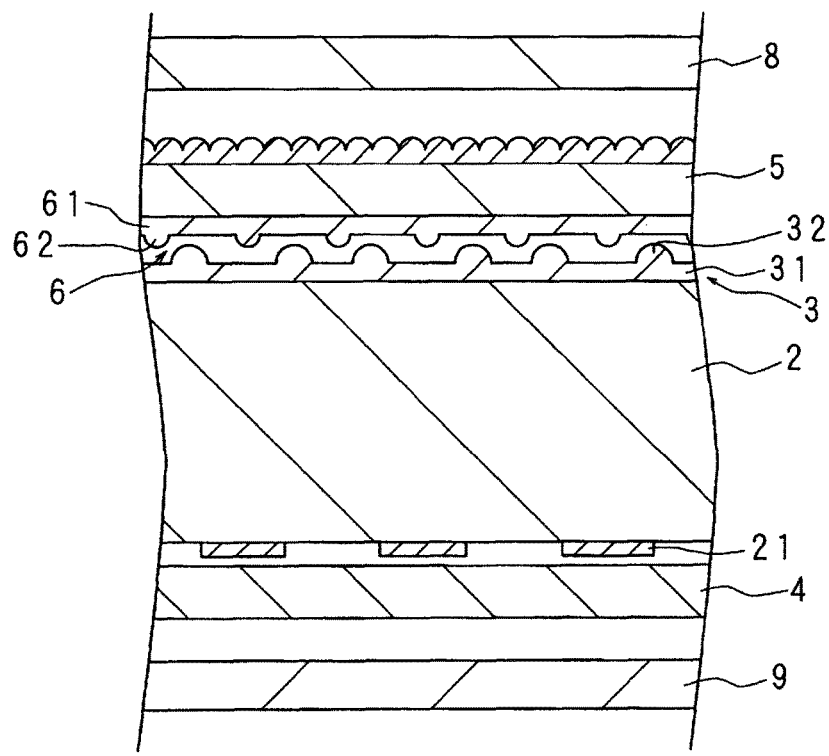
FIG. 7 is a partially enlarged cross-sectional view of FIG. 6.
Figure 8:
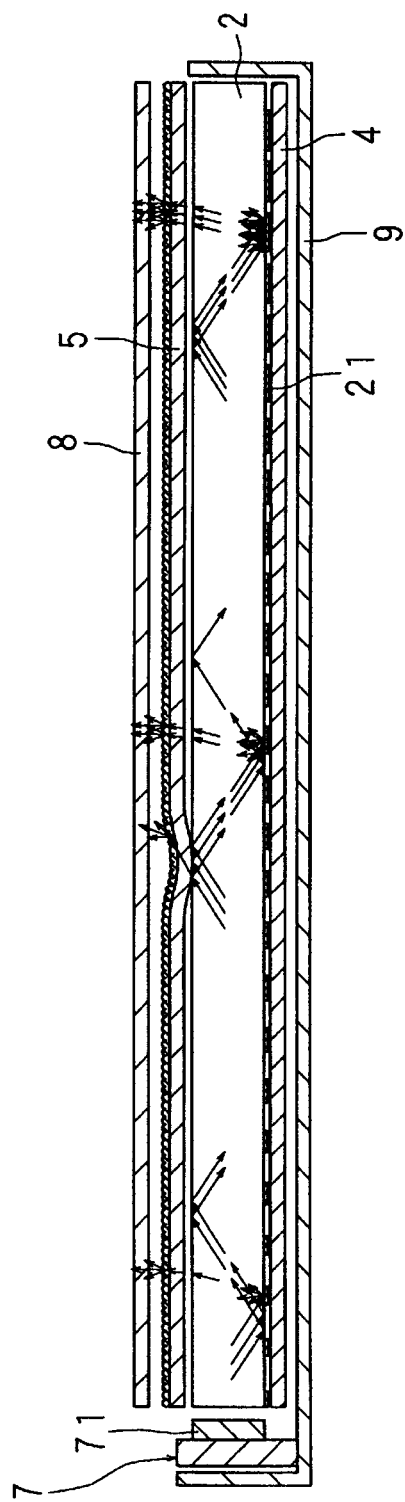
FIG. 8 is a schematic cross-sectional view for illustrating a related-art display module.
Figure 9:
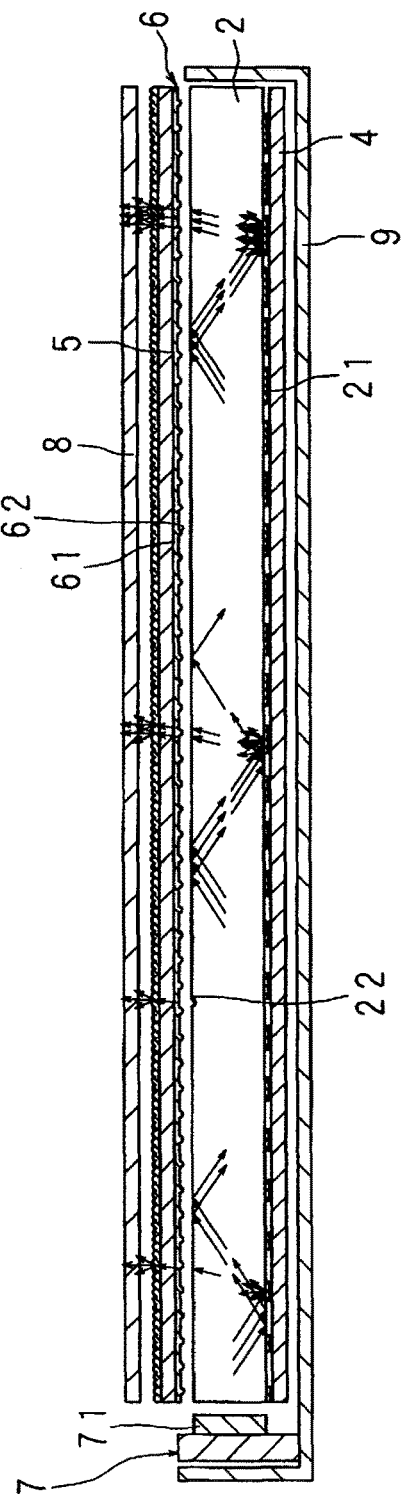
FIG. 9 is a schematic cross-sectional view for illustrating a related-art display module of Patent Document 1, for example.
Figure 10:
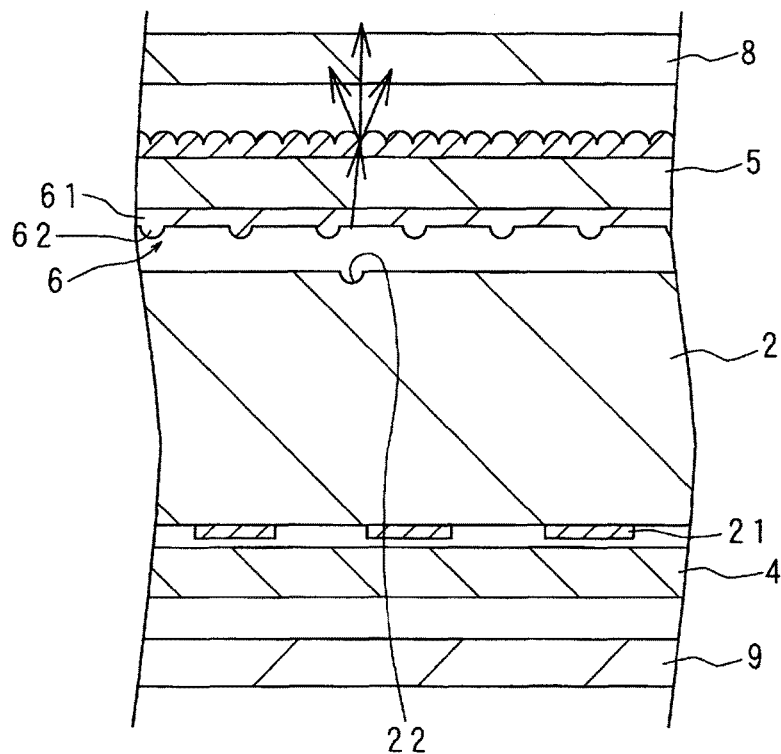
FIG. 10 is a partially enlarged cross-sectional view of FIG. 9.
Figure 11A:
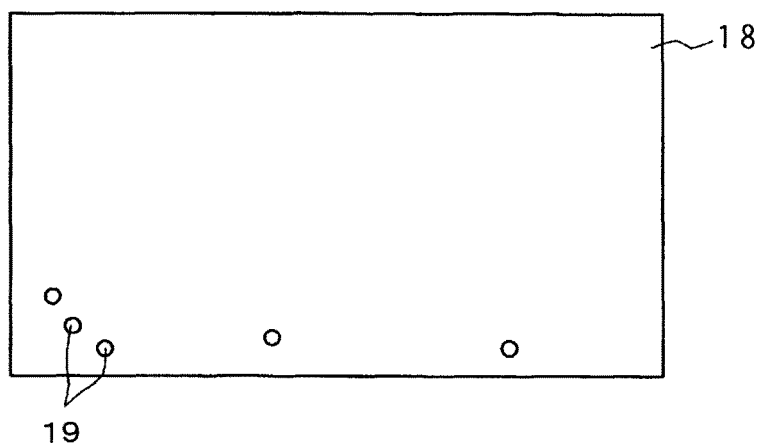
FIG. 11A is a schematic front view of the display module for illustrating a state in which white spot defects have occurred.
Figure 11B:
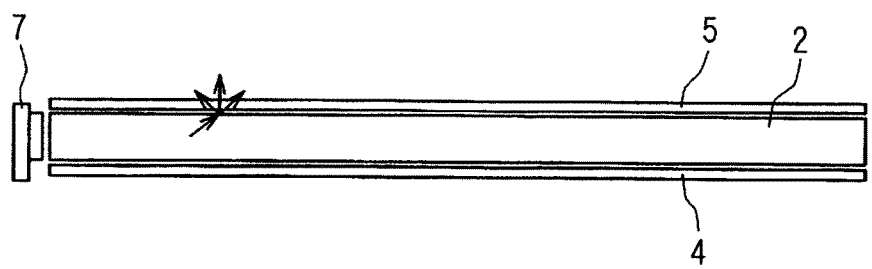
FIG. 11B is a schematic cross-sectional view for illustrating a state in which light output from a flaw is scattered by an optical sheet.

FIG. 6 is a schematic cross-sectional view of the display module 16, and FIG. 7 is a partially enlarged view of FIG. 6. Parts identical to those of FIG. 2 and FIG. 3 are denoted by like reference numerals, and a detailed description thereof is omitted.

In the display module 16, on the lower surface, facing the light guide plate 2, of the optical sheet 5, the close contact prevention layer 6 is formed.

The close contact prevention layer 6 includes a binder (adhesive resin film) 61, which is formed on the optical sheet 5, and beads (protrusions) 62, which are dispersed in the binder 61 in a state in which portions of the beads 62 are protruded from a surface of the binder 61.

Examples of a material of the binder 61 include a soft elastomeric material having a low glass transition temperature of −100° C. or more and 30° C. or less, for example. Specifically, the examples include, for example, an acrylic resin, polyurethane, polyester, a fluorine-based resin, a silicone resin, polyamide-imide, and an epoxy resin. The binder 61 may contain, in addition to a polymer, a plasticizer, a stabilizer, an antidegradant, a dispersant, and an antistatic agent, for example. The binder 61 needs to be optically transparent, and is preferably clear and colorless.

Examples of a material of the beads 62 include, as with the binder 61, a soft elastomeric material. Specifically, the examples include polyurethane, silicone rubber, polystyrene, and a thermoplastic polyester. The beads 62 need to be optically transparent, and are preferably clear and colorless.

The beads 62 are substantially spherical, and from the viewpoint of preventing close contact, have an average particle diameter of preferably 3 µm or more and 10 µm or less, and more preferably 3 µm or more and 5 µm or less.

An amount of protrusion of the beads 62 from the surface of the binder 61 when the binder 61 mixed with the beads 62 is applied to the surface of the optical sheet 5 is preferably 0.8 µm or more and 7 µm or less, and more preferably more than 0.8 µm and 3 µm or less.

An average particle diameter of the beads 32 is preferably more than 10 µm and 20 µm or less, and more preferably 12 µm or more and 18 µm or less.

An amount of protrusion of the beads 32 from the surface of the binder 31 when the binder 31 mixed with the beads 32 is applied to the surface of the light guide plate 2 is preferably more than 5 µm and 12 µm or less, and more preferably 6 µm or more and 10 µm or less.

The amount of protrusion of the beads 62 from the surface of the binder 61 is set smaller than the amount of protrusion of the beads 32 from the surface of the binder 31 to prevent a flaw from being generated in the light guide plate 2 when the optical sheet 5 and the light guide plate 2 are brought into friction contact with each other.

In Embodiment 2, the beads 32 formed on the light guide plate 2 prevent the partial close contact between the light guide plate 2 and the optical sheet 5, with the result that the flaw is prevented from being generated in the light guide plate 2, and hence occurrence of a white spot defect at the time of emitting light is suppressed. In addition, the flaw can be prevented from being generated with a friction of the optical sheets 5 due to oscillations and other such causes during storage in stack and conveyance of the optical sheets 5, and the optical sheet 5 can be prevented from adhering during manufacture of the display module.

It is to be understood that Embodiments 1 and 2 disclosed herein are merely examples in all aspects and in no way intended to limit the present invention. The scope of the present invention is not intended to be defined by the meaning of the above description, but is intended to encompass meaning equivalent to those of the appended claims and all modifications made within the appended claims.

For example, the protrusions on an exit surface of the light guide plate 2 are not limited to the case of being formed by applying the binder 31 having the beads 32 dispersed therein. In addition, the structure of the optical sheet 5 is not limited to those described in Embodiments 1 and 2. Further, the display apparatus according to the present invention is not limited to the case of being applied to the TV set.

What is claimed is:

1. A display apparatus, comprising:
    a rectangular display panel, which includes a screen frontward thereof;
    an optical sheet having a rectangular shape, which is arranged rearward of the rectangular display panel;
    a light guide plate having a rectangular shape, which is arranged rearward of the optical sheet;
    a light source, which is arranged to face a side surface of the light guide plate; and
    a first close contact prevention layer provided on a surface, facing the optical sheet, of the light guide plate, wherein
    the first close contact prevention layer comprises a first binder and a plurality of first beads dispersed in the first binder, and
    the plurality of first beads form a plurality of first protrusions for preventing close contact with the optical sheet, at a surface of the first close contact prevention layer.

2. The display apparatus according to claim 1, wherein the first binder has a glass transition temperature of 30° C. or less.

3. The display apparatus according to claim 1,
wherein the plurality of first beads has a glass transition temperature of 30° C. or less.

4. The display apparatus according to claim 1, further comprising a second close contact prevention layer provided on a surface, facing the light guide plate, of the optical sheet, wherein
the second close contact prevention layer comprises a second binder and a plurality of second beads dispersed in the second binder, and
the plurality of second beads form a plurality of second protrusions for preventing close contact with the light guide plate, at a surface of the second close contact prevention layer.

5. The display apparatus according to claim 4, wherein a first amount of protrusion of the plurality of first protrusions is smaller than a second amount of protrusion of the plurality of second protrusions.

6. The display apparatus according to claim 5, wherein the first amount of protrusion is more than 5 μm and 12 μm or less, and the second amount of protrusion is 0.8 μm or more and 7 μm or less.

7. The display apparatus according to claim 1, wherein the following expression is satisfied: $1<n_2<n_1$, where $n_1$ represents a refractive index of the light guide plate, and $n_2$ represents a refractive index of the first binder.

8. The display apparatus according to claim 1,
wherein the light guide plate has scattering dots formed on a surface opposite to an exit surface facing the optical sheet, the scattering dots being configured to reflect light so as to be output through the exit surface.

* * * * *